(12) United States Patent
Yeo et al.

(10) Patent No.: US 10,993,231 B2
(45) Date of Patent: Apr. 27, 2021

(54) METHOD AND DEVICE FOR OPERATION BASED ON MULTIPLE CHANNELS IN SENSOR NETWORK

(71) Applicant: ELECTRONICS AND TELECOMMUNICATIONS RESEARCH INSTITUTE, Daejeon (KR)

(72) Inventors: Geon Min Yeo, Daejeon (KR); Sun Hwa Lim, Daejeon (KR); Young Il Kim, Sejong-si (KR); Dae Geun Park, Daejeon (KR); Soon Yong Song, Sejong-si (KR); Byeong Cheol Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 397 days.

(21) Appl. No.: 15/983,251

(22) Filed: May 18, 2018

(65) Prior Publication Data
US 2018/0338311 A1    Nov. 22, 2018

(30) Foreign Application Priority Data

May 18, 2017    (KR) .................. 10-2017-0061479

(51) Int. Cl.
*H04W 72/04*    (2009.01)
*H04W 74/02*    (2009.01)
(Continued)

(52) U.S. Cl.
CPC ... *H04W 72/0453* (2013.01); *H04W 72/0413* (2013.01); *H04W 72/0446* (2013.01);
(Continued)

(58) Field of Classification Search
None
See application file for complete search history.

(56) References Cited

U.S. PATENT DOCUMENTS

| 9,325,368 B2 * | 4/2016 | Serizawa ............ H04B 7/2656 |
| 10,616,881 B2 * | 4/2020 | Liu ....................... H04L 5/0048 |

(Continued)

FOREIGN PATENT DOCUMENTS

| KR | 10-2010-0084465 A | 7/2010 |
| KR | 10-0968346 B1 | 7/2010 |

(Continued)

*Primary Examiner* — Hassan A Phillips
*Assistant Examiner* — Gautam Sharma
(74) *Attorney, Agent, or Firm* — LRK Patent Law Firm

(57) ABSTRACT

A method of transmitting control information by an end node in a wireless communication system supporting multi-channel transmission includes: transmitting control information to a center node on a first channel among multiple channels within a control period of a wireless frame when the first channel is in an idle state; transmitting the control information to the center node on a second channel when the first channel is not in the idle state and the second channel is in the idle state, the second channel being selected from channels other than the first channel among the multiple channels; and transmitting the control information to the center node in a subsequent wireless frame when the second channel is not in the idle state.

20 Claims, 13 Drawing Sheets

(51) Int. Cl.
  *H04W 4/38* (2018.01)
  *H04W 74/08* (2009.01)
  *H04W 84/18* (2009.01)
  *H04L 29/08* (2006.01)
(52) U.S. Cl.
  CPC ............. *H04W 74/02* (2013.01); *H04L 67/12* (2013.01); *H04W 4/38* (2018.02); *H04W 74/0816* (2013.01); *H04W 84/18* (2013.01)

(56) References Cited

U.S. PATENT DOCUMENTS

| | | | | |
|---|---|---|---|---|
| 2010/0118812 | A1* | 5/2010 | Kim | H04W 72/082 370/329 |
| 2011/0176465 | A1* | 7/2011 | Panta | H04W 52/0235 370/311 |
| 2012/0307762 | A1* | 12/2012 | Reumerman | H04W 28/26 370/329 |
| 2013/0010719 | A1* | 1/2013 | Shapira | H04W 72/082 370/329 |
| 2013/0028104 | A1* | 1/2013 | Hui | H04W 40/125 370/252 |
| 2013/0286966 | A1 | 10/2013 | Chung et al. | |
| 2014/0146704 | A1* | 5/2014 | Cho | H04L 5/06 370/254 |
| 2014/0334338 | A1* | 11/2014 | Joo | H04W 4/08 370/254 |
| 2014/0341206 | A1 | 11/2014 | Shin et al. | |
| 2017/0041927 | A1* | 2/2017 | Jeong | H04W 74/0816 |
| 2017/0041949 | A1 | 2/2017 | Ngo et al. | |
| 2018/0184422 | A1* | 6/2018 | Cavalcanti | H04W 72/0446 |

FOREIGN PATENT DOCUMENTS

| | | |
|---|---|---|
| KR | 10-2012-0032558 A | 4/2012 |
| KR | 10-2013-0074139 A | 7/2013 |
| WO | 2008/072082 A2 | 6/2008 |

* cited by examiner

METHOD AND DEVICE FOR OPERATION BASED ON MULTIPLE CHANNELS IN SENSOR NETWORK

CROSS REFERENCE TO RELATED APPLICATION

The present application claims priority to Korean Patent Application No. 10-2017-0061479, filed May 18, 2017, the entire content of which is incorporated herein for all purposes by this reference.

BACKGROUND OF THE INVENTION

1. Field of the Invention

The present disclosure relates generally to a sensor network. More particularly, the present disclosure relates to a method and device for operation based on multiple channels in a sensor network.

2. Description of Related Art

In a conventional sensor network, one network (e.g., a personal area network (PAN)) is configured for each channel. In a single-tier (tier-1) network structure in which one or more sensor devices are connected to one PAN coordinator as well as in a multi-tier (tier-2) network structure in which one or more intermediate nodes are connected to one PAN coordinator and one or more sensor devices are connected to each of the intermediate nodes, one PAN is configured per channel. In this case, in order to share the resource among multiple sensor devices on one channel, a time-division multiplexing scheme is applied, and thus the transfer rate that may be supported in one PAN is limited.

Thus, a method of overcoming the limitation of transfer rate on one wireless channel is required.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and is intended to propose a method and device for supporting multi-channel operation.

Also, the present disclosure is intended to propose a method and device, which is an end node, for transmitting and receiving control information and data according to a wireless frame structure supporting multi-channel operation.

Also, the present disclosure is intended to propose a method and device, which is a center node, for transmitting and receiving control information and data according to a wireless frame structure supporting multi-channel operation.

It is to be understood that technical problems to be solved by the present disclosure are not limited to the aforementioned technical problems and other technical problems which are not mentioned will be apparent from the following description to a person with an ordinary skill in the art to which the present disclosure pertains.

The object of the present invention can be achieved by providing a method of transmitting control information by an end node in a wireless communication system supporting multi-channel transmission, the method comprising: transmitting control information to a center node on a first channel among multiple channels within a control period of a wireless frame when the first channel is in an idle state; transmitting the control information to the center node on a second channel when the first channel is not in the idle state and the second channel is in the idle state, wherein the second channel being selected from channels other than the first channel among the multiple channels; and transmitting the control information to the center node in a subsequent wireless frame when the second channel is not in the idle state.

In another aspect of the present invention, provided herein an end node device that transmits control information in a wireless communication system supporting multi-channel transmission, the end node device comprising: a transceiver; a memory; and a processor, wherein the processor is configured to, within a control period of a wireless frame, transmit control information to a center node on a first channel when the first channel is in an idle state among multiple channels; transmit the control information to the center node on a second channel when the first channel is not in the idle state and the second channel selected from channels other than the first channel among the multiple channels is in the idle state; and transmit the control information to the center node in a subsequent wireless frame when the second channel is not in the idle state.

In another aspect of the present invention, a method of operating a center node in a wireless communication system supporting multi-channel transmission, the method comprising: transmitting control information to an end node on a first channel among multiple channels within a control period of a wireless frame; and receiving the control information from the end node on the first channel or on a second channel among the multiple channels within the control period of the wireless frame, wherein when the first channel is not in an idle state, the second channel is a channel selected randomly by the end node.

In another aspect of the present invention, a center node device that operates in a wireless communication system supporting multi-channel transmission, the center node device comprising: a a transceiver; a memory; and a processor, wherein the processor is configured to, transmit control information to an end node on a first channel among multiple channels within a control period of a wireless frame; receive the control information from the end node on the first channel or on a second channel among the multiple channels within the control period of the wireless frame, wherein when the first channel is not in an idle state, the second channel is a channel selected randomly by the end node.

In another aspect of the present invention, the control period of the wireless frame includes a control information reception period of the end node and a control information transmission period of the end node.

In another aspect of the present invention, the wireless frame includes the control period and a data period.

In another aspect of the present invention, in a specific time period determined based on resource assignment information within the data period of the wireless frame, the end node transmits data to the center node on a third channel determined based on the resource assignment information among the multiple channels.

In another aspect of the present invention, the resource assignment information includes information on a channel on which transmission of the end node is allowed, a time at which transmission of the end node is allowed, a transmission size of the end node, and a transmission cycle of the end node.

In another aspect of the present invention, in the specific time period, data transmission on the third channel from the end node to the center node is performed simultaneously with data transmission on a fourth channel from, other than the end node, another end node to the center node.

In another aspect of the present invention, the third channel is one of the first channel and the second channel.

In another aspect of the present invention, the third channel is a channel other than the first channel and the second channel.

In another aspect of the present invention, the control information transmitted on the first channel is received by a master node of the center node, and the control information transmitted on the second channel is received by one sub-node corresponding to the second channel among one or more sub-nodes of the center node.

In another aspect of the present invention, the end node receives a beacon frame from the center node at a start time of the wireless frame.

In another aspect of the present invention, the control information includes at least one of registration request information and resource assignment request information of the end node.

In addition, the features briefly summarized above for this disclosure are exemplary aspects of the detailed description of the disclosure which follow, and are not intended to limit the scope of the disclosure.

According to the present disclosure, the method and device, which is the end node, for transmitting and receiving control information and data according to a wireless frame structure supporting multi-channel operation is provided.

According to the present disclosure, the method and device, which is the center node, for transmitting and receiving control information and data according to a wireless frame structure supporting multi-channel operation is provided.

Effects that may be obtained from the present disclosure will not be limited to only the above described effects. In addition, other effects which are not described herein will be apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
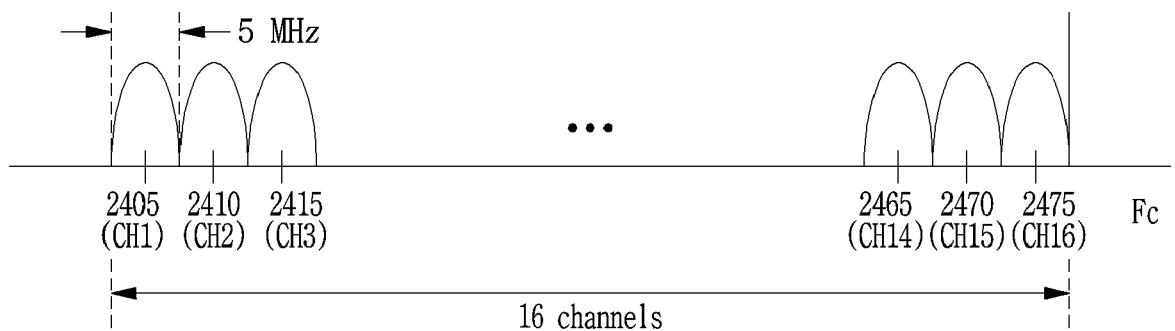
FIG. 1 is a view illustrating an example of channel configuration in 2.4 GHz band.

Hereinbelow, exemplary embodiments of the present disclosure will be described in detail with reference to the accompanying drawings such that the disclosure can be easily embodied by one of ordinary skill in the art to which this disclosure belongs. However, the present disclosure may be variously embodied, without being limited to the exemplary embodiments.

In describing embodiments of the present disclosure, it is noted that when the detailed description of known configurations or functions related to the present disclosure may make the gist of the present disclosure unclear, the detailed description of thereof will be omitted. Also, portions that are not related to the present disclosure are omitted in the drawings, and like reference numerals designate like elements.

In the present disclosure, when an element is "coupled to", "combined with", or "connected to" another element, it can be directly coupled to the other element or intervening elements may be present therebetween. Also, when a constituent "comprises" or "includes" an element, unless there is another opposite description thereto, the constituent does not exclude other elements but may further include the elements.

In the present disclosure, the terms "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, elements that are distinguished from each other to clearly describe each feature do not necessarily denote that the elements are separated. That is, a plurality of elements may be integrated into one hardware or software unit, or one element may be distributed into a plurality of hardware or software units. Accordingly, even if not mentioned, the integrated or distributed embodiments are included in the scope of the present disclosure.

In the present disclosure, elements described in various embodiments do not denote essential elements, and some of the elements may be optional. Accordingly, an embodiment that includes a subset of elements described in another embodiment is included in the scope of the present disclosure. Also, an embodiment that includes the elements which are described in the various embodiments and additional other elements is included in the scope of the present disclosure.

Center node: a node that configures and manages a network supporting multiple frequencies (or multiple channels). The center node includes one master node and one or more sub-nodes. As an example, there is a coordinator in a sensor network.

Master node: a node in charge of sending and receiving on a basic frequency (or a basic channel) in the center node.

Sub-node: a node in charge of receiving on each frequency (or channel) in the center node.

End node: a node that is connected to the center node, exchanges control information with the center node, and transmits data to the center node. As an example, there is a sensor device in a sensor network.

The definitions of the terms are merely illustrative, and the scope of the present disclosure is not limited by the definitions. For example, the definitions of the terms do not exclude basic meanings of the terms, which can be easily understood by a person skilled in the art.

Hereinafter, a method and device for operation based on multiple channels according to the present disclosure will be described.

Wireless sensor communication is a communication method of transmitting data (e.g., sensing information) generated by a sensor to a final destination in a wireless manner. The wireless sensor communication is based on low data-transfer rate, compared to cellular communication or mobile communication such as 3GPP LIE, and may support a battery-driven environment in an environment where it is difficult to supply power to sensor devices by wire.

Thus, in the wireless sensor communication, devices are required to support operation in a limited power condition, so that intensity of the signal transmitted by the device is also limited, which may result in relatively short radio wave coverage.

IEEE 802.15.4 is developed as the representative international standard for the wireless sensor communication. IEEE 802.15.4 defines the physical layer (PHY) for low power communication, the medium access control (MAC) layer, and an interface with the upper layers for application service. The basic performance level defined in IEEE 802.15.4 ensures the data-transfer rate of up to 250 kbps when offset quadrature phase-shift keying (OQPSK) modulation applies, and a basic channel coding mechanism is not included for low power consumption.

FIG. 1 is a view illustrating an example of channel configuration in 2.4 GHz band FIG. 1 shows 16 exemplary channels defined in the frequency domain. The width of each channel may be defined as 5 MHz, and intervals between center frequencies of respective channels may be defined also as 5 MHz. For example, a first channel (CH1) may be defined at a frequency position with the center frequency (Fc) of 2405 MHz, and a second channel (CH2) may be defined at a frequency position with the center frequency of 2410 MHz. Similarly, a sixth channel (CH16) may be defined at a frequency position with the center frequency of 2475 MHz.

The example of FIG. 1 shows that multiple channels divided in the frequency domain may be defined in the operating frequency band of the wireless sensor communication. The scope of the present disclosure is not limited to the example of the operating frequency band, the number of channels, the center frequency of the channel, etc.

As shown in FIG. 1, total 16 channels in 5 MHz units may be defined and operated, and one a personal area network (PAN) may be configured for each channel. One PAN is a basic unit of the sensor network.

Figure 2:
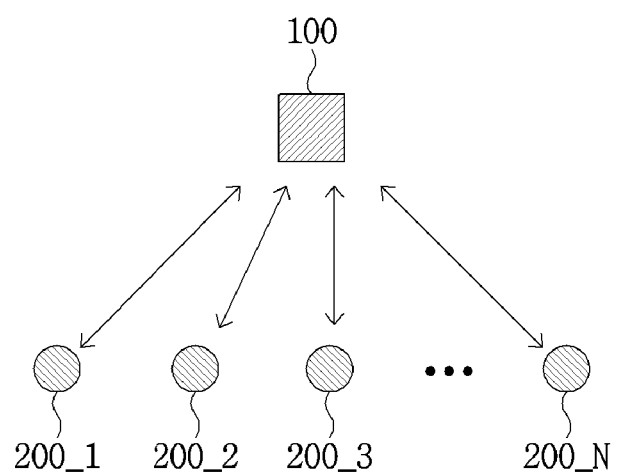
FIG. 2 is a view illustrating an example of a PAN structure.

FIG. 2 is a view illustrating an example of a PAN structure.

The PAN may consist of one PAN coordinator 100 and N devices 200_1, 200_2, . . . , and 2001_N. The example of FIG. 2 shows a single-tier (tier-1) PAN structure in which one PAN coordinator 100 is in direct association with one or more devices 200.

Figure 3:
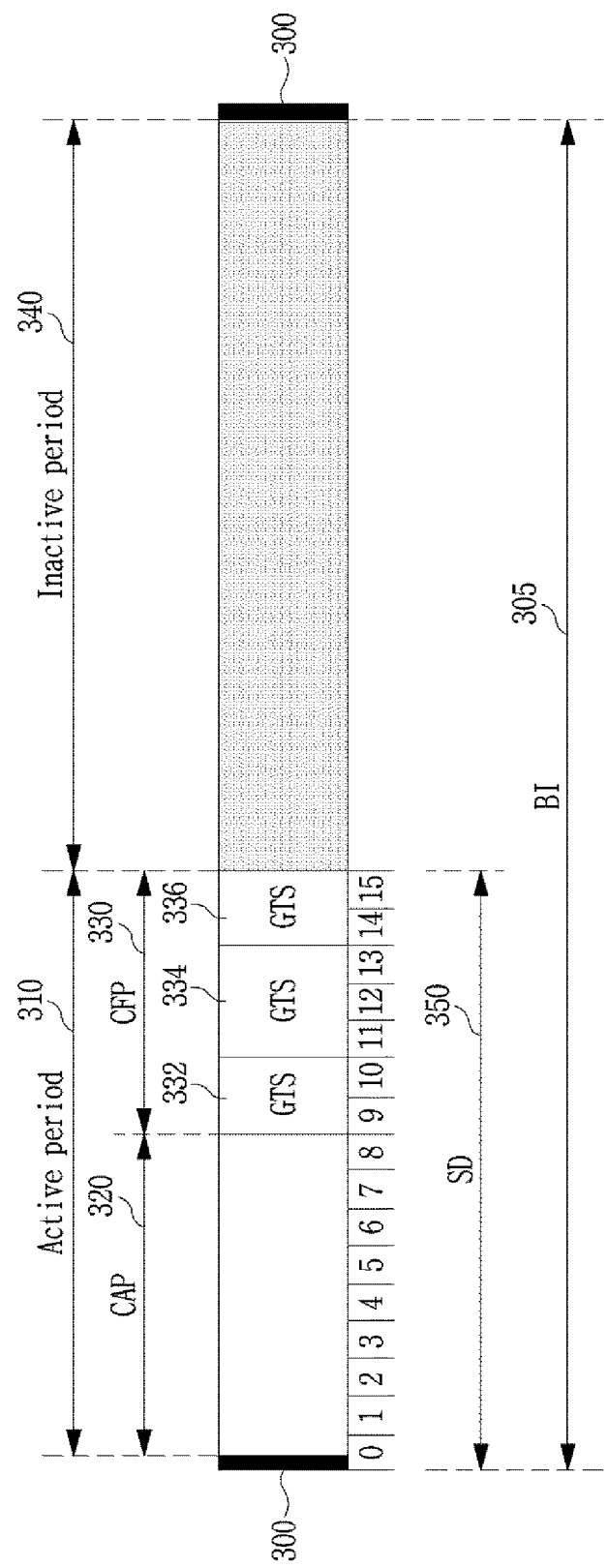
FIG. 3 is a view illustrating an example of a wireless frame format.

FIG. 3 is a view illustrating an example of a wireless frame format.

In the example of FIG. 3, the PAN coordinator 100 may transmit a beacon frame 300. The beacon frame contains information related to the PAN configuration, and may be broadcast to all devices 200 in the PAN. Also, the beacon frame 300 may be transmitted periodically at predetermined time intervals. The time interval at which the beacon frame 300 is transmitted may be referred to as a beacon interval (BI) 305. Each of the devices in the PAN receives the beacon frame 300 and performs time synchronization based thereon, and then performs data transmission/reception.

An active period 310 is a time period during which data transmission/reception is performed, and an inactive period 340 is a time period during which data transmission/reception is not performed.

The active period 310 may include a contention access period (CAP) 320 and a contention free period (CFP) 330.

In the CAP 320, data transmission of an arbitrary device may be performed according to carrier sense multiple access with collision avoidance (CSMA/CA) scheme in which a device to transmit data senses a wireless channel first and performs transmission only when the channel is idle (i.e., when transmission of another device is not sensed).

In the CFP 320, transmission may be performed on the basis of a time slot (i.e., a guaranteed time slot (GTS)) in which transmission of only a particular device is allowed and transmission of other devices is not allowed. For example, the GTS 332, the GTS 334, and the GTS 336 may be assigned to different devices.

Thus, in the CAP 320, all devices in the PAN may attempt to transmit data anytime, so that collision may occur when different devices attempt to perform transmission at the same time. In the meantime, in the CFP 330, a unique transmission/reception time (GTS) for a particular device is assigned to avoid transmission collision.

A time period containing a transmission period of the beacon frame 300, the CAP 320, and the CFP 330 may be referred to as superframe duration (SD) 350. In the example of FIG. 3, the active period 310 may be defined as a combination, excluding the transmission period of the beacon frame 300, of the CAP 320 and the CFP 330. However, the active period 310 is not limited thereto, the active period 310 may be defined as the same time period as the SD 350.

When using the wireless frame structure as shown in FIG. 3, the number of GTSs 332, 334, and 336 that may be assigned within the active period 310 or the SD 350 is limited. For example, when the number of devices 200 in association with the PAN coordinator 100 is large, time periods of the GTSs to be assigned to the devices are insufficient.

Also, the device 200 in the PAN basically attempts to perform transmission in the CAP 320 in CSMA/CA scheme, which will be described in detail with reference to FIG. 4.

Figure 4:
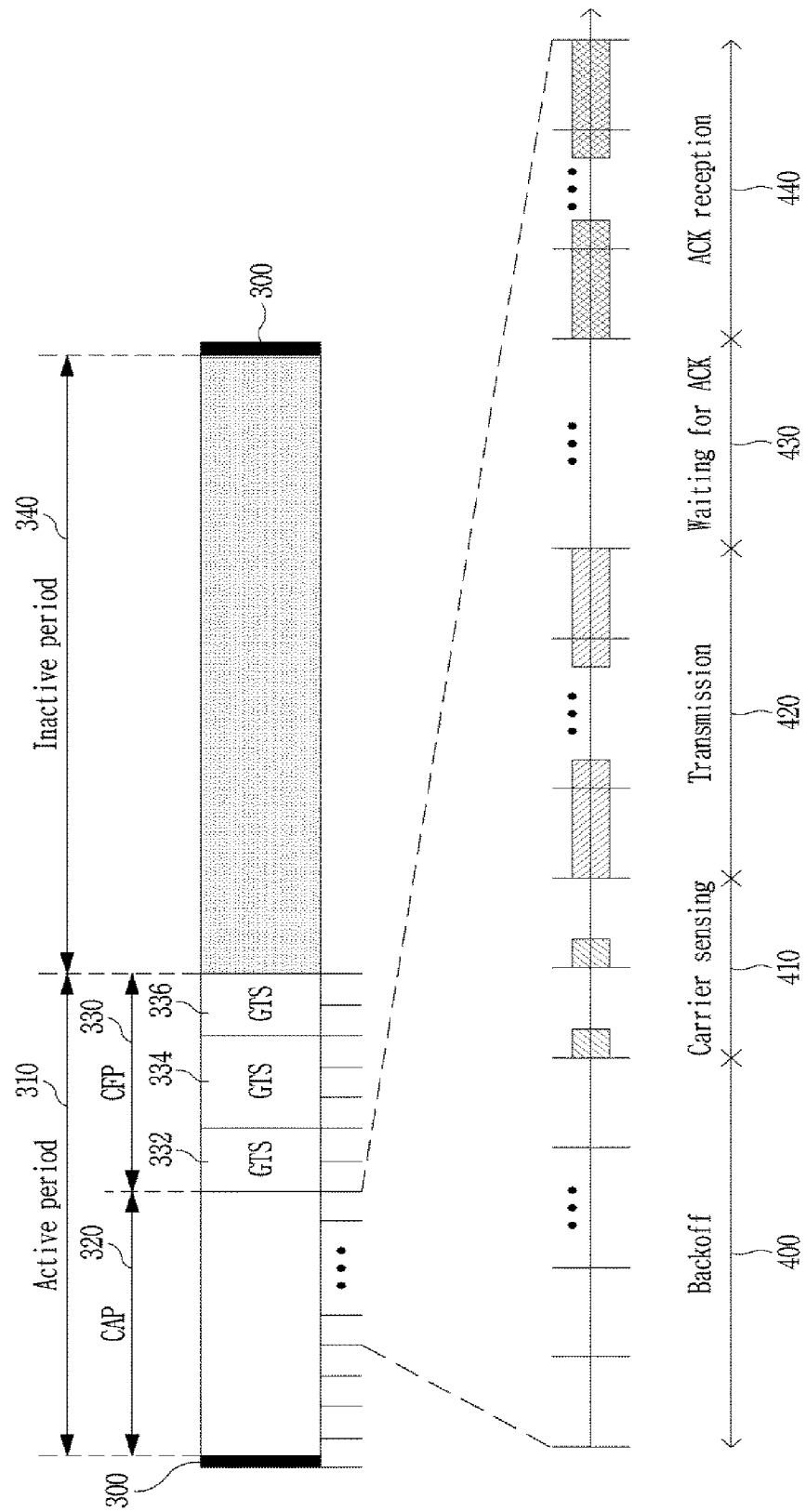
FIG. 4 is a view illustrating operation of a device in CSMA/CA scheme.

FIG. 4 is a view illustrating operation of a device in CSMA/CA scheme.

The device having data to be transmitted may attempt to perform channel access in the CAP 320 in CSMA/CA scheme, after receiving the beacon frame 300 and completing synchronization, etc.

First, the device may initiate backoff 400 in an arbitrary slot of the CAP 320. Backoff 400 means an operation that delays transmission during the number of time slots (or backoff counter) determined based on a value randomly selected within a given range. By performing backoff 400 operation, the values of the back off counters selected randomly by several devices are likely to be different from each other, such that the number of devices that simultaneously start data transmission may be reduced. For example, the unit backoff period may be given as the length of 20 symbols. The period from the start to the end of the entire backoff counter may contain $2^N-1$ unit backoff periods, and the value of N may be a value randomly selected by the device.

When the backoff 400 period is completed (or when countdown of the backoff counter is completed), the device may perform carrier sensing 410 in which whether or not the wireless channel is in an idle state is determined. Carrier sensing 410 may include a method of checking whether reception power exceeding a predetermined threshold value is present on the wireless channel, etc. When the reception power exceeding the predetermined threshold value is sensed, it may be determined that the wireless channel is in use (busy) and transmission may be further delayed until the wireless channel is in the idle state. When the reception power which is equal to or less than the predetermined threshold value is sensed, it may be determined that the wireless channel is in an idle state and transmission 420 may start. The period in which the device performs carrier sensing may be the period of first eight symbols each time slot, rather than the entire period of the time slot.

Alternatively, backoff 400 and carrier sensing 410 operations may be performed in such a manner as to count down the backoff counter, only when the wireless channel is in the idle state.

After completing transmission 420, the device may wait for receiving acknowledgement (ACK) information. An ACK may be information indicating that a target device has successfully received data. For example, the length of time the device waits for ACK reception may be given as the length of 22 symbols. When the device does not start ACK reception within the period of 12 symbols, it may be determined that previous transmission has failed, and re-transmission, etc. may be performed.

When ACK reception 440 is performed within the ACK reception waiting time, the device may determine that previous transmission was successful. The length of the ACK packet may be, for example, a length of 22 symbols.

As described above with reference to FIG. 4, the device may continuously monitor within the CAP 320 whether or not the wireless channel is occupied. When operating in this manner, the device continuously consumes power for a reception attempt within the CAP 320.

Figure 5:
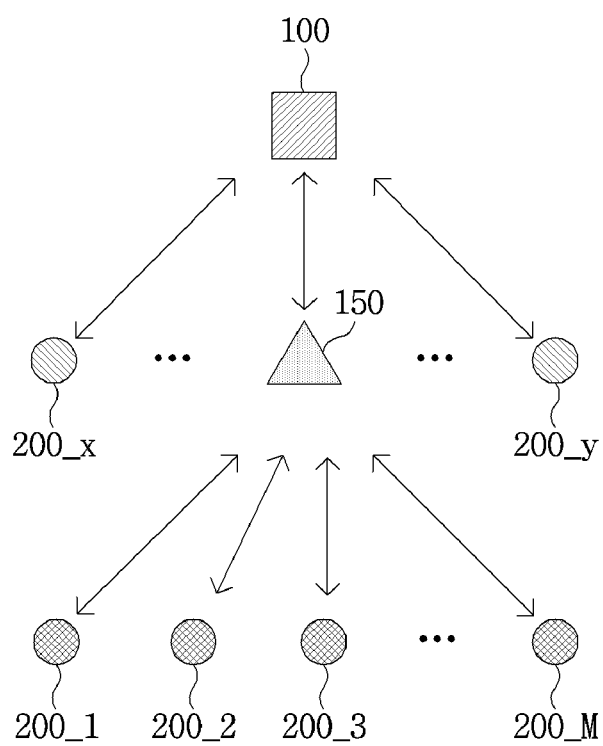
FIG. 5 is a view illustrating an additional example of a PAN structure.

FIG. 5 is a view illustrating an additional example of a PAN structure.

In order to solve the problem that only limited communication coverage is supported due to low transmission power in the single-tier PAN structure as shown in the example of FIG. 2, a device similar to a relay in a mobile communication system may be introduced to extend the communication coverage.

Unlike devices 200_x, 200_y, etc. in direct association with the highest PAN coordinator 100, the example of FIG. 5 shows a structure where devices 200_1, 200_2, . . . , and 200_M are in direct association with a coordinator 150, which is an intermediate node, and the coordinator 150 is in direct association with the highest PAN coordinator 100. That is, the coordinator 150 may function as a device in terms of the PAN coordinator 100, and may function as a coordinator in terms of devices 200_1, 200_2, . . . , and 200_M. The PAN structure as shown in the example of FIG. 5 may be a multi-tier (tier-2) PAN structure.

Figure 6:
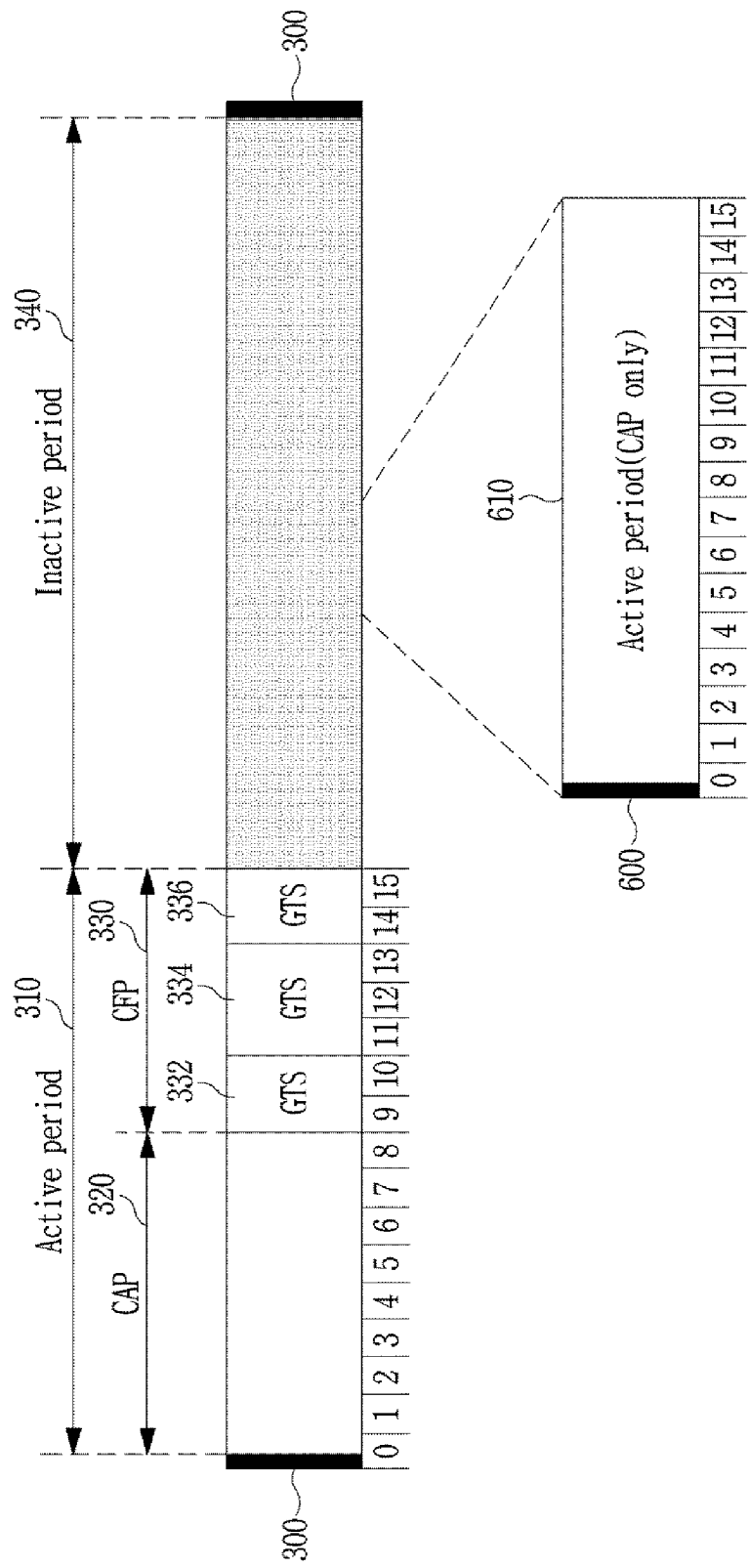
FIG. 6 is a view illustrating an additional example of a wireless frame format.

FIG. 6 is a view illustrating an additional example of a wireless frame format.

Within an inactive period 340 of a beacon interval 305 of the PAN coordinator 100, the coordinator 150 may transmit its own beacon frame 600 (i.e., a coordinator beacon frame), and may configure its own active period 610 (i.e., a coordinator active period).

The coordinator 150 may transmit a beacon frame independently of the PAN coordinator 100, and a beacon period of the coordinator 150 may form a unique wireless frame of each coordinator.

That is, by using a particular period of the inactive period 340 of the PAN coordinator 100, the coordinator 150 may transmit its beacon frame 600 to be in association with its sub-devices 200_1, 200_2, . . . , and 200_M and to perform synchronization, and may set the coordinator active period 610 to induce data transmission/reception for the sub-devices 200_1, 200_2, . . . , and 200_M.

When the wireless frame is configured as shown in the example of FIG. 6, a transmission period of each coordinator in the entire wireless frame may be a type of time division multiplexing (TDM) structure divided in the time domain.

Here, the wireless frame structure defined in IEEE 802.15.4 has a restriction that the use of the GTS is not allowed for the devices 200_1, 200_2, . . . , and 200_M in association with the coordinator 150 which is an intermediate node. That is, for the devices 200_1, 200_2, . . . , and 200_M in association with the coordinator 150 which is an intermediate node, contention based transmission using the CAP 610 is only allowed. This restriction on the multi-tier PAN structure does not allow dedicated channel transmission (i.e., the GTS) using the coordinator 150, and thus the fixed transfer rate of the device may not be guaranteed. Also, the same channel (i.e., the same frequency) is used by the devices in association with the coordinator 150 which is an intermediate node of the PAN coordinator 100, and by the devices in direct association with the PAN coordinator 100. Therefore, the number of devices that may be acceptable in the entire multi-tier PAN structure configured by one PAN coordinator 100 is limited, and the transfer rate for each device is also limited. Thus, when an application requires a high fixed transfer rate, the scope of service to be provided by using the multi-tier PAN structure as shown in FIG. 5 and the wireless frame format as shown in FIG. 6 may be limited.

As described above, when only one frequency (or one channel) is supported in one PAN structure, there is a problem that the number of acceptable devices and the fixed transfer rate may not be guaranteed.

In the present disclosure, in order to solve the problem and to enhance efficiency of low power device operation and of wireless resource utilization, a method of supporting multiple frequencies (or multiple channels) in one PAN structure will be described.

According to the various examples of the present disclosure, one center node may perform control to support and to manage overall transmission/reception using multiple wireless channels. More specifically, according to the various examples of the present disclosure, a wireless frame structure where the control period and the data period are separated for each channel (or frequency) may be provided. Thus, the efficiency of wireless resource utilization may be enhanced, an application requiring a higher fixed transfer rate may be supported, and the overall system throughput may be enhanced ultimately.

Figure 7:
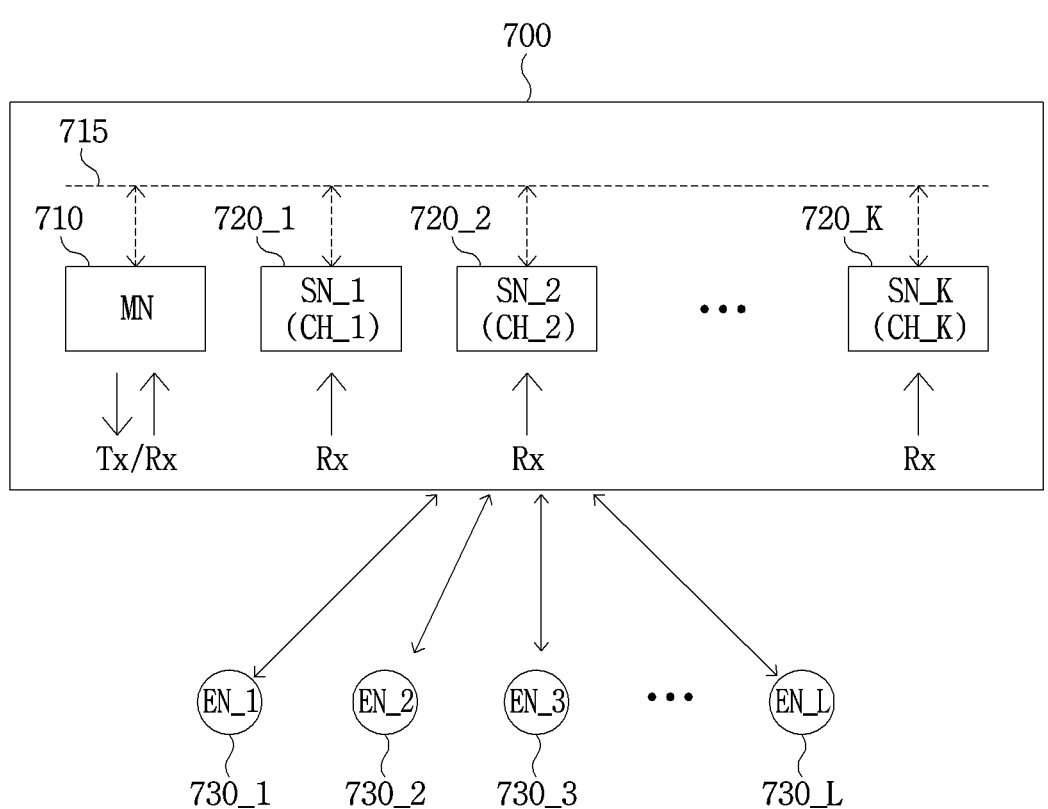
FIG. 7 is a view illustrating an example of a configuration of a center node according to the present disclosure.

FIG. 7 is a view illustrating an example of a configuration of a center node according to the present disclosure.

A center node 700 may include one master node (MN) 710 and one or more sub-nodes (SNs) 720_1, 720_2, . . . , and 720_K.

The MN 710 may perform transmission and reception on a fundamental or basic channel (e.g., the 0-th channel (CH_0)).

SNs 720_1, 720_2, . . . , and 720_K may perform reception on respective additional channels (e.g., CH_1, CH_2, . . . , and CH_K).

For example, CH_0 may correspond to a channel with the lowest center frequency, and CH_1, CH_2, . . . , and CH_K may correspond to respective channels with other center frequencies. Alternatively, CH_0 may correspond to a channel with the highest center frequency, and CH_1, CH_2, . . . , and CH_K may correspond to respective channels with other center frequencies. Alternatively, CH_0 may correspond to a basic channel or a primary channel, and CH_1, CH_2, . . . , and CH_K may correspond to additional channels or secondary channels.

The scope of the present disclosure is not limited by the channel number or the frequency position, and includes that when one center node 700 supports multiple channels (or multiple frequencies), any one thereof is managed by the MN 710 and the remaining ones are managed by the SNs 720.

Signals and data may be transmitted and received via a communication interface 715 between the MN 710 and one or more SNs 720. Communications between the MN 710 and one or more SNs 720 may use various wired or wireless communication protocols.

The center node 700 may be in association with one or more end nodes (ENs) 730_1, 730_2, . . . , and 730_L. Each EN 730 may operate at a specific time on any one of multiple channels (or multiple frequencies). That is, each EN 730 may support both transmission and reception on multiple channels (or multiple frequencies), but may operate on only one channel (or one frequency) thereof at a specific time.

Due to the characteristic of the sensor network, it is often the case that the wireless channel is used to receive, by the center node 700, sensing data collected from the EN 730, rather than to transmit a signal from the center node 700 to the EN 730. Also, a signal transmitted from the center node 700 to the EN 730 mostly contains control information for registration, association, synchronization, resource assignment, etc. of the EN 730, and rarely contains data. Therefore, substantial wireless channel resources are not required for the center node 700 to transmit control information to the EN 730 and to receive control information and data from the EN 730, and thus the MN 710 may be in charge of transmission and reception on one specific channel (e.g., CH_0). Also, substantial wireless channels are required for the center node 700 to receive data from the EN 730, and thus respective SNs 720_1, 720_2, . . . , and 720_K are in charge of reception on respective wireless channels (e.g., CH_1, CH_2, . . . , and CH_K).

Figure 8:
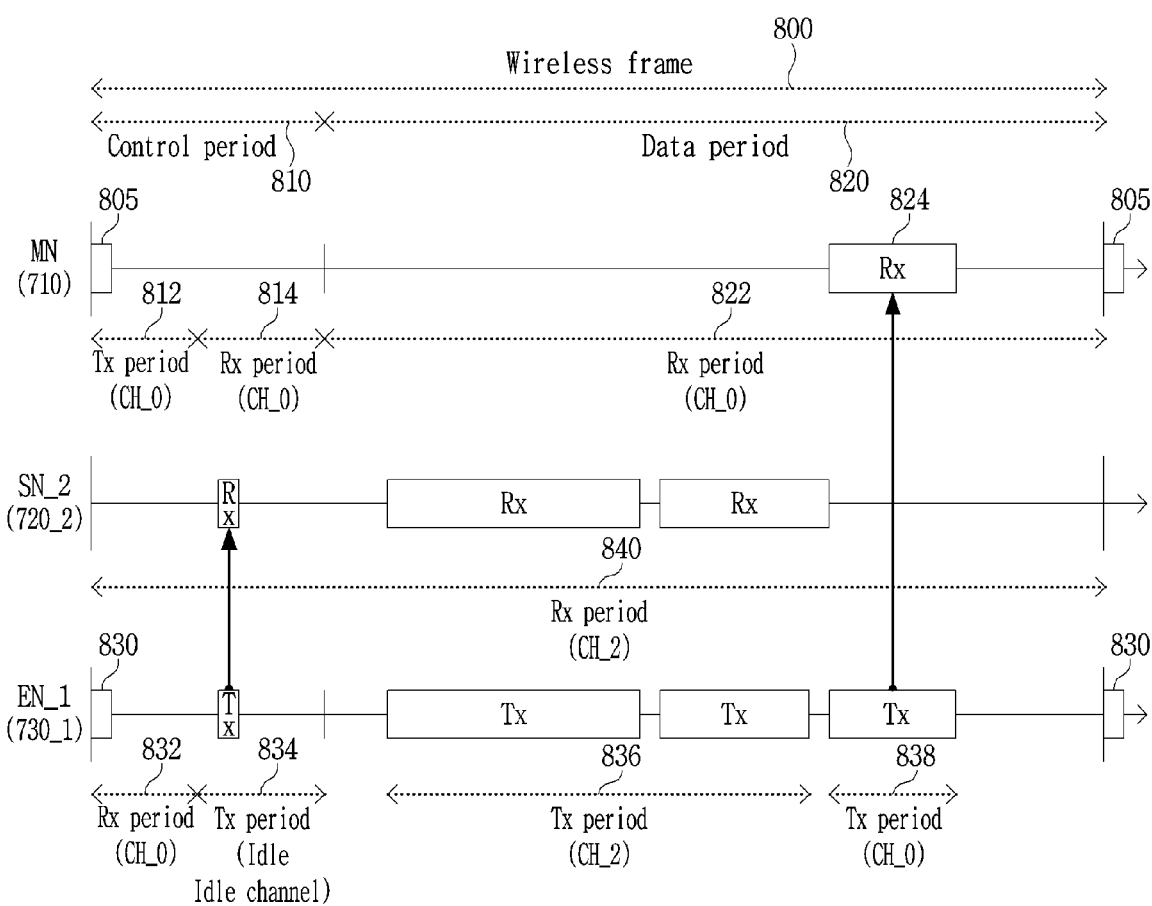
FIG. 8 is a view illustrating an example of a wireless frame structure according to the present disclosure.

FIG. 8 is a view illustrating an example of a wireless frame structure according to the present disclosure.

In the example of FIG. 8, a wireless frame 800 may contain a control period 810 and a data period 820.

The control period 810 may be defined as a period in which the center node 700 transmits control information to the EN 730 and receives control information from the EN 730. That is, the control period 810 may be defined as a period in which the EN 730 receives control information from the center node 700 and transmits control information to the center node 700.

The data period 820 may be defined as a period in which the center node 700 receives data from the EN 730. That is, the data period 820 may be defined as a period in which the EN 730 transmits data to the center node 700.

In terms of the MN 710, the wireless frame 800 is a basic unit for performing transmission/reception, and one duty cycle may consist of a beacon frame transmission period 805, a CH_0 transmission (Tx) period 812, a CH_0 reception (Rx) period 814, and a CH_0 Rx period 822. The wireless frame 800 may be configured to repeat in time.

The SN 720 may attempt to receive data on a channel (or frequency) managed by itself during the wireless frame period, and may transmit the received data to the MN 710. For example, in the example of FIG. 8, during a reception (Rx) period 840 on the CH_2, the SN_2 720_2 may attempt to receive control information and data from the EN 730 on the relevant channel, and may transmit the received control information and data to the MN 710.

It is assumed that the MN 710 knows the number (i.e., K in the example of FIG. 7) of channels (or frequencies) supported by the center node 700 and the characteristics of the channels (e.g., center frequencies, etc.).

The MN 710 may periodically transmit a beacon frame in the beacon frame transmission period 805 on a specific channel (e.g., CH_0). The beacon frame in the beacon frame transmission period 805 may contain control information for each EN 730. That is, each EN 730 may periodically receive, in a beacon frame reception period 830, the beacon frame transmitted on the specific channel (e.g., CH_0) from MN 710.

Specifically, the center node 700 is required to obtain or set the control information related to each EN 730. For example, the control information related to the EN 730 may include information, such as a transmission frequency, a transmission channel, a transmission start time, a transmission size (i.e., the size of the data packet to be transmitted), etc. The control information may be exchanged between the center node 700 and the EN 730 during the control period 810. More specifically, the MN 710 of the center node 700 may transmit the control information to the EN 730 on the specific channel (e.g., CH_0), and may receive the control information from the EN 730.

For example, the MN 710 may transmit the beacon frame in the beacon frame transmission period 805 during the transmission period 812 within the control period 810, so that the control information (e.g., information such as a frequency (or a channel), data transmission time, etc.) for the EN_1 730_1 may be transmitted to the EN_1 730_1. The EN_1 730_1 may receive the control information (e.g., a beacon, a registration response message, a resource assignment message, etc.) from the center node 700 during an Rx period 832 of the control period 810.

The EN_1 730_1 may transmit the control information to the center node 700 during a Tx period 834 within the control period 810. Here, the EN_1 730_1 may transmit the control information during the Tx period 834 within the control period 810 by using a channel in an idle state.

Here, transmission of the control information through the channel in the idle state includes selecting one channel randomly from all channels including the basic channel (e.g., CH_0) and additional channels (e.g., CH_1, CH_2, . . . ) that are supported by the center node 700, and transmitting the control information when the selected channel is in the idle state. Also, when the basic channel (e.g., CH_0) is in the idle state, the EN 730 transmits the control information first through the basic channel. When the basic channel is not in the idle state, one channel is selected randomly from the remaining channels, and when the selected channel is in the idle state, the control information may be transmitted.

For example, the EN_1 730_1 may transmit a registration request message to the center node 700 during the Tx period 834 within the control period 810 through the CH_2 in the idle state in order to register a unique address of the EN_1 730_1 in the center node 700.

When the SN_2 720_2 receives the registration request message from the EN_1 730_1 during the Rx period 840 on the CH_2, the SN_2 720_2 may transmit the registration request message to the MN 710.

When the MN 710 receives the registration request message from the EN_1 730_1, the MN 710 may transmit a registration response message to the EN_1 730_1 through the CH_0 during the Tx period 812 of the control period 810.

Thus, the control information transmitted by the EN 730 to the center node 700 may be transmitted during the transmission period 834 of the control period 810. Here, the channel that the EN 730 used to transmit the control information is not assigned by the center node 700, but may be randomly selected by the EN 730. That is, one channel is randomly selected from multiple channels, and the control information may be transmitted when the selected channel is in the idle state. That is, the EN 730 may transmit the control information on the randomly selected channel in CSMA/CA scheme.

Also, in the example of FIG. 8, the Tx periods 812 and 834 and the Rx periods 814 and 832 are set only once within one control period 810, but the scope of the present disclosure is not limited thereto, and includes that the Tx period 812, 834 and the Rx periods 814, 832 in pairs are repeated several times within the control period 810 of one wireless frame.

Furthermore, in the example of FIG. 8, the control period 810 and the data period 820 are set only once within one wireless frame 800, but the scope of the present disclosure is not limited thereto, and includes that the control period 810 and the data period 820 in pair are repeated several times within one wireless frame 800.

As additional, example, the EN_1 730_1 may transmit a transmission permission request message containing its Tx size to the center node 700 through the CH_2 in the idle state during the control period 810.

When the SN_2 720_2 receives the transmission permission request message from the EN_1 730_1 during the Rx period 840 on the CH_2 the SN_2 720_2 may transmit the transmission permission request message to the MN 710.

When the MN 710 receives the transmission permission request message from the EN_1 730_1, the MN 710 may transmit a transmission permission response message to the EN_1 730_1 through the CH_0 during the Tx period 812 or the beacon transmission period 805 of the control period 810.

The transmission permission response message may include an address of the EN to which the transmission permission response message is transmitted and a transmission parameter set. The transmission parameter set may include transmission-allowed channel (or frequency) identification information, information on a transmission time, on a transmission size, on a transmission cycle (a cycle within the wireless frame), etc.

For example, the MN 710 may provide the EN_1 730_1 with resource assignment information for dividing and trans-mitting data into multiple channels (or frequencies) according to the Tx size requested by the EN_1 730_1. Thus, according to the resource assignment information provided by the MN 710, the EN_1 730_1 may transmit a data packet at a transmission time approved on the relevant channel (or frequency).

In the example of FIG. 8, the EN_1 730_1, which obtained transmission parameters via the transmission permission response message, may transmit data to the center node 700 on the assigned channel (e.g., CH_2) during a Tx period 836. When the SN_2 720_2 receives data on the CH_2 from the EN_1 730_1, the SN_2 720_2 may transmit the data to the MN 710.

Also, the EN_1 730_1, which obtained the transmission parameters via the transmission permission response message, may transmit data to the center node 700 on the assigned channel (e.g., CH_0) during a Tx period 838. The MN 710 may receive, in a master node data reception period 824, data from the EN_1 730_1 during the Rx period 822 on the CH_0.

Figure 9:
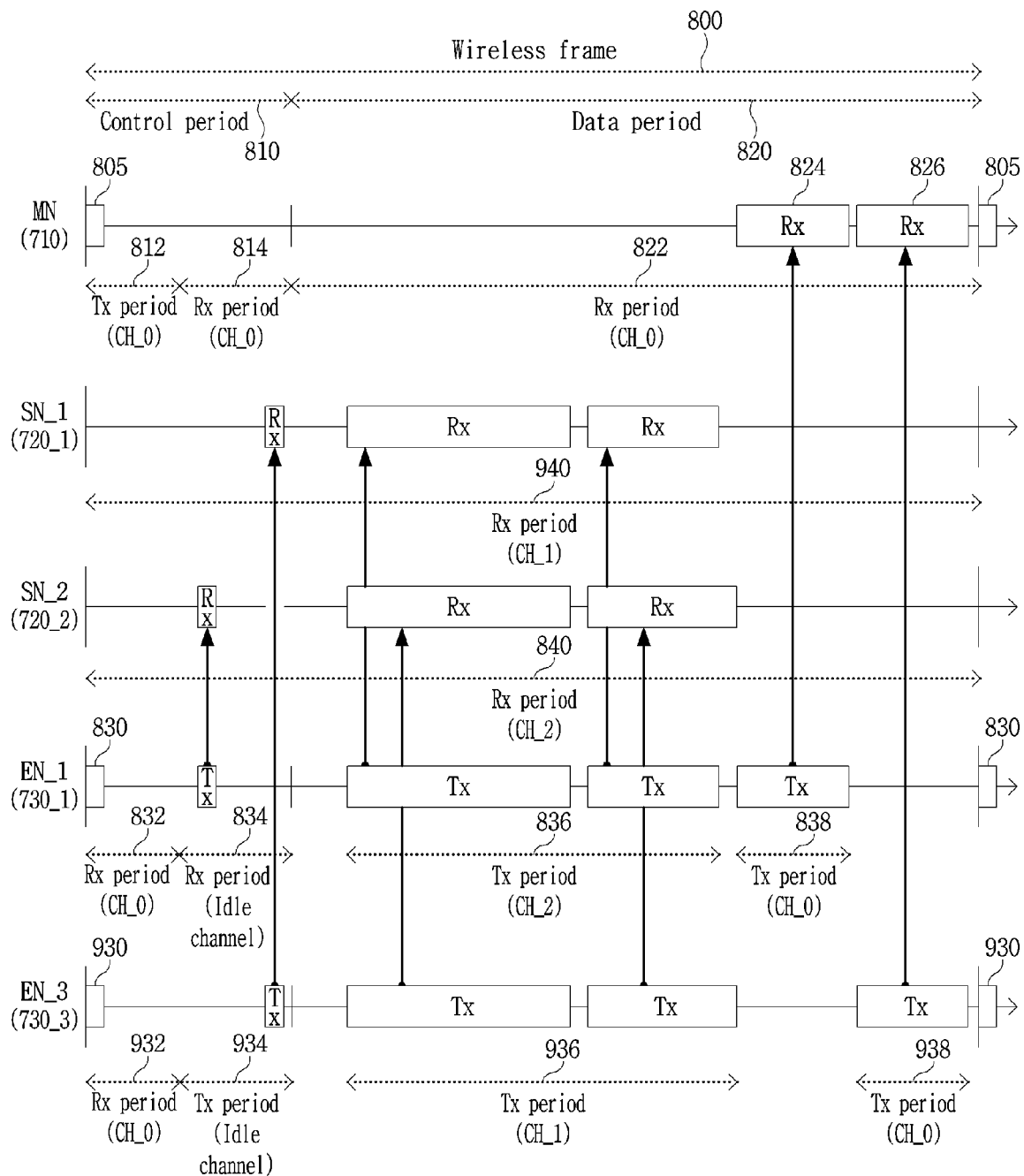
FIG. 9 is a view illustrating an additional example of a wireless frame structure according to the present disclosure.

FIG. 9 is a view illustrating an additional example of a wireless frame structure according to the present disclosure.

In the example of FIG. 9, an EN_3 730_3 and an SN_1 720_1 are added, compared to the example of FIG. 8. That is, it is an example illustrating that data transmission/reception is performed on different channels (or frequencies) simultaneously within a network composed of one center node 700.

The EN_3 730_3 may receive, in a beacon frame reception period 930, the beacon frame periodically transmitted in the beacon frame transmission period 805 on the CH_0 from the MN 710. Also, the EN_3 730_3 may receive the control information, such as the resource assignment information, etc., from the MN 710 during an Rx period 932 within the control period 810.

Also, the EN_3 730_3 may select a channel randomly during a Tx period 934 within the control period 810, and when the selected channel (e.g., CH_1) is in the idle state, the control information may be transmitted. The control information transmitted on the CH_1 by the EN_3 730_3 may be received by the SN_1 720_1, and then may be transmitted to the MN 710.

The EN_3 730_3 may transmit data to the center node 700 during a Tx period 936 on the channel (e.g., CH_1) assigned according to the resource assignment information provided by the MN 710. When the SN_1 720_1 receives data on the CH_1 from the EN_3 730_3, the SN_1 720_1 may transmit the data to the MN 710.

Also, the EN_3 730_3 may transmit data to the center node 700 during a Tx period 938 on the channel (e.g., CH_0) assigned according to the resource assignment information provided by the MN 710. The MN 710 may receive, in a master node data reception period 826, data from the EN_1 730_1 during the Rx period 822 on the CH_0.

In the example of FIG. 9, during the Tx period 936 on the CH_1 and the Tx period 836 on the CH_2, data transmission of the EN_3 730_3 and of the EN_1 730_1 may be simultaneously performed respectively, and data may be received by the SN_1 720_1 and the SN_2 720_2 in charge of respective channels.

Also, in the example of FIG. 9, on the CH_0, the Tx period 838 assigned to the EN_1 730_1 and the Tx period 938 assigned to the EN_3 730_3 may be assigned as time periods divided in a TDM scheme.

As described above, in one network composed of one center node 700, data transmission/reception performed on multiple channels (or multiple frequencies) simultaneously is supported, so that the overall system throughput may be greatly enhanced.

In the examples of the present disclosure described with reference to FIGS. 8 and 9, the index of the end node (EN) and the index of the sub-node (SN) are merely exemplary and are not limited thereto.

That is, according to the various examples of the present disclosure, the master node (MN) of the center node may transmit the control information to one or more end node on a predetermined basic channel (e.g., CH_0) during a center node transmission period (i.e., an EN reception period) within the control period, and may receive the control information from one or more end node on a randomly selected channel (i.e., the basic channel preferentially, or a random channel among the basic channel and additional channels) through a sub-node or a master node corresponding to the selected channel during an EN transmission period (i.e., a center node reception period) within the control period.

Also, in the various examples of the present disclosure, one or more end node may transmit data to the center node on the channel and in the time period (i.e., the EN transmission period, an SN reception period, or an MN reception period) assigned by the center node. Here, the channel assigned by the center node may be the basic channel (e.g., CH_0) and one or more additional channels (e.g., CH_1, CH_2, . . . ). That is, a data transmission period assigned to each end node in the data period of the wireless frame may include a data transmission period for each of one or more channels, and data transmission periods for different channels may be divided in the time domain. Also, time periods in which multiple end nodes transmit data to the center node on different channels may be partially or all overlapped. That is, resources are assigned in such a manner that multiple end nodes transmit data to the center node simultaneously on different channels. In terms of the center node, the master node or the sub-nodes managing the respective channels may receive data from the end nodes.

Figure 10:
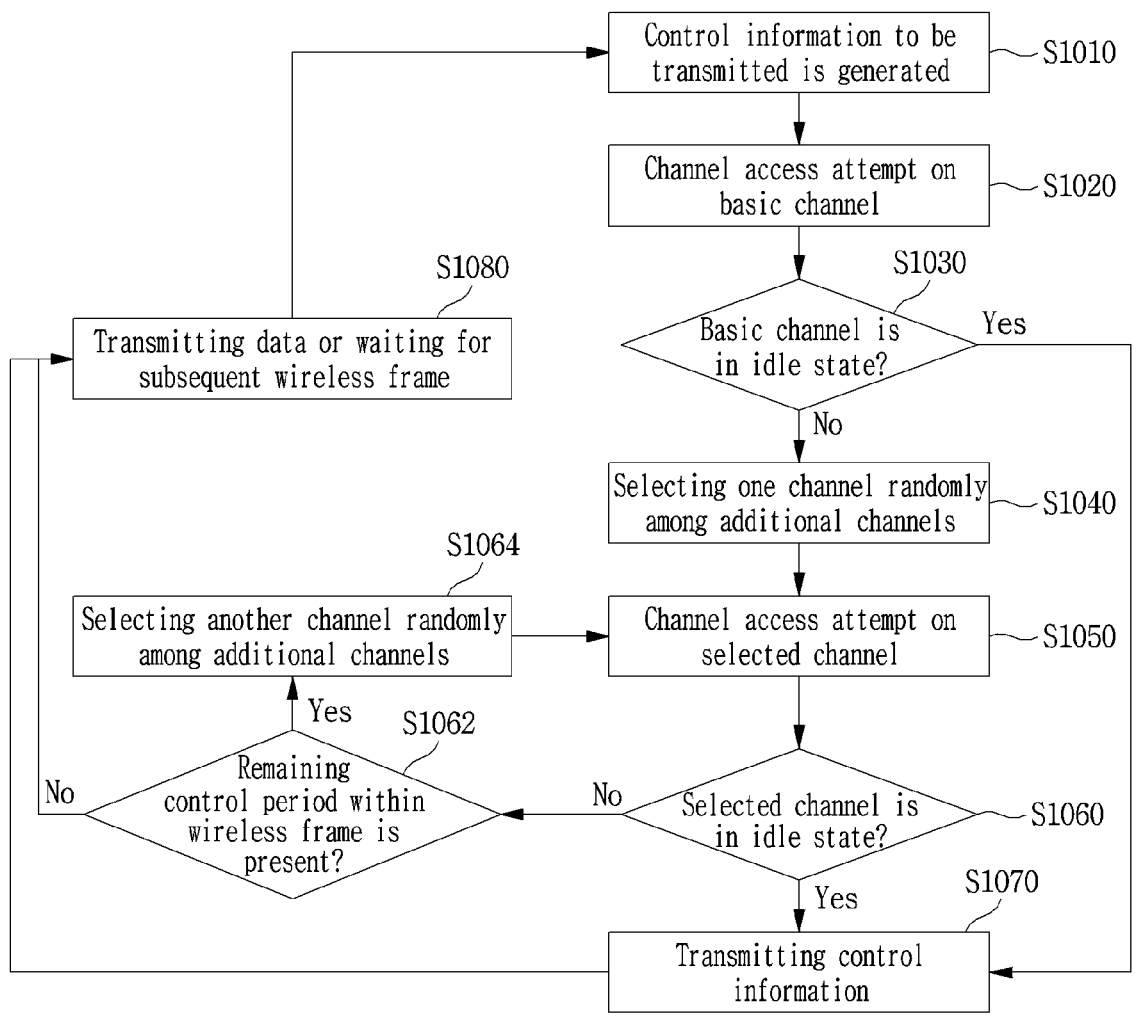
FIG. 10 is a flowchart illustrating operation of an end node according to the present disclosure.

FIG. 10 is a flowchart illustrating operation of an end node according to the present disclosure.

The example of FIG. 10 shows that the end node 730 transmits the control information. Although not shown in FIG. 10, it is assumed that the end node 730 has obtained, from the center node 700 via a beacon, etc., set information on the period 814 in which transmission of the end node 730 is allowed within the control period 810 of the wireless frame 800.

At step S1010, the control information (or a control packet) to be transmitted by the end node 730 to the center node 700 may be generated.

At step S1020, the end node 730 may attempt to perform channel access on the basic channel (e.g., CH_0), among K+1 channels (e.g., CH_0, CH_1, . . . , and CH_K) supported by the center node 700. An attempt to perform channel access may include checking whether the relevant channel is in the idle state by performing backoff, carrier sensing, etc. on the relevant channel according to CSMA/CA scheme.

At step S1030, the end node 730 may determine a channel to transmit the control information depending on whether the basic channel is in the idle state.

When the basic channel is in the idle state, the end node 730 may transmit the control information on the basic channel at step S1070. At step S1080, data may be transmitted during the data period within the relevant wireless frame according to the resource assignment information, or waiting for a subsequent wireless frame may be performed when there is no data to transmit.

Here, the channel assigned for data transmission of the end node 730 may be the same as or different from the basic channel (e.g., CH_0) on which the end node 730 transmits the control information. Also, data may be transmitted to the center node 700 (i.e., the master node 710 or the sub-node 720 of the center node 700, which corresponds to the assigned channel) on the assigned channel during the assigned time period within the data period 820 of the wireless frame 800.

When the basic channel is not in the idle state, the end node 730 may select one channel randomly among the additional channels (e.g., CH_1, CH_2, . . . , and CH_K) at step S1040. For example, it is assumed that CH_2 is selected.

At step S1050, the end node 730 may attempt to perform channel access on the selected channel (e.g., CH_2). An attempt to perform channel access may include checking whether the relevant channel is in the idle state by performing backoff, carrier sensing, etc. on the relevant channel according to CSMA/CA scheme.

At step S1060, the end node 730 may determine a channel to transmit the control information depending on whether the selected channel (e.g., CH_2) is in the idle state.

When the selected channel (e.g., CH_2) is in the idle state, the end node 730 may transmit the control information on the selected channel (e.g., CH_2) at step S1070. At step S1080, data may be transmitted during the data period within the relevant wireless frame according to the resource assignment information, or waiting for a subsequent wireless frame may be performed when there is no data to transmit.

Here, the channel assigned for data transmission of the end node 730 may be the same as or different from the channel (e.g., CH_2) selected by the end node 730 to transmit the control information. Also, data may be transmitted to the center node 700 (i.e., the master node 710 or the sub-node 720 of the center node 700, which corresponds to the assigned channel) on the assigned channel during the assigned time period within the data period 820 of the wireless frame 800.

When the selected channel (e.g., CH_2) is not in the idle state, the end node 730 may determine whether the control period remains within the current wireless frame. More specifically, within the control period of the wireless frame, whether the transmission period of the end node is equal to or greater than the minimum time (e.g., a backoff time, a carrier sensing time, a control packet time length, etc.) required for the end node to transmit the control information may be determined.

When the remaining control period within the wireless frame is insufficient, data may be transmitted during the data period within the relevant wireless frame according to the resource assignment information at step S1080, or waiting for a subsequent wireless frame may be performed when there is no data to transmit.

Here, the channel assigned for data transmission of the end node 730 may be the same as or different from the channel (e.g., CH_1) selected by the end node 730 to transmit the control information. Also, data may be transmitted to the center node 700 (i.e., the master node 710 or the sub-node 720 of the center node 700, which corresponds to the assigned channel) on the assigned channel during the assigned time period within the data period 820 of the wireless frame 800.

When the remaining control period within the wireless frame is sufficient, the end node 730 may select one channel randomly among, except for the previously selected channel (e.g., CH_2), the remaining additional channels (e.g., CH_1, CH_3, . . . , and CH_K) at step S1064. For example, it is assumed that the CH_1 is selected.

Thus, the end node 730 may attempt to perform channel access on the selected channel (e.g., CH_1) at step S1050, and the control information may be transmitted at step S1070 depending on whether the selected channel (e.g., CH_1) is in the idle state. Alternatively, another channel may be further selected at step S1064, or data transmission or waiting for a subsequent wireless frame may be performed at step S1080.

Figure 11:
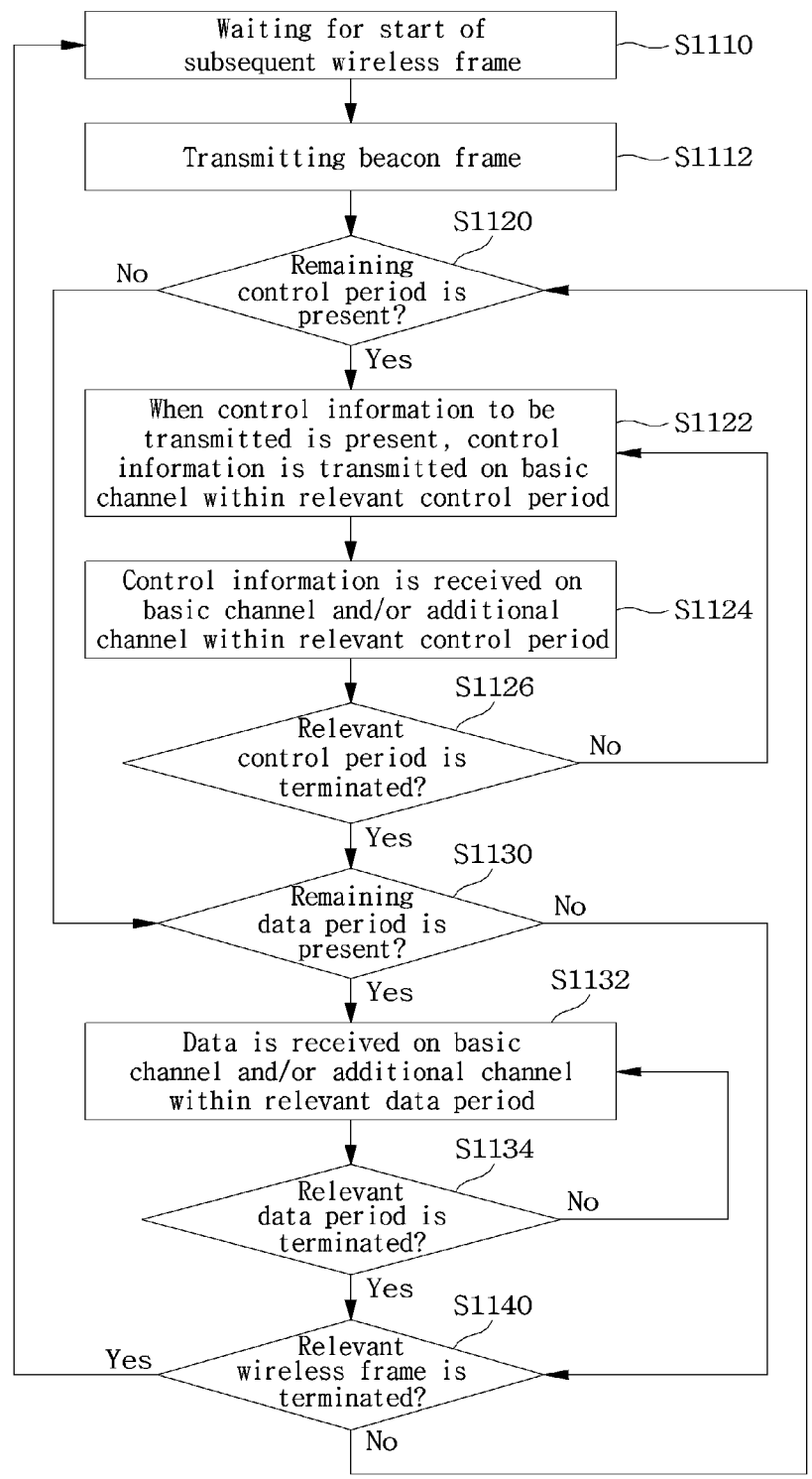
FIG. 11 is a flowchart illustrating operation of a center node according to the present disclosure.

FIG. 11 is a flowchart illustrating operation of a center node according to the present disclosure.

At step S1110, the center node 700 may wait until a wireless frame start time, and at step S1112, may transmit the beacon frame at the wireless frame start time.

At step S1120, the center node 700 may determine whether a remaining control period within the wireless frame is present.

In the case where the control period is present, when the control information to be transmitted is present at step S1122, the master node 710 of the center node 700 may transmit the control information on the basic channel (e.g., CH_0) within the relevant control period.

At step S1124, when the control information is received on the basic channel (e.g., CH_0) within the relevant control period, the control information received through the master node 710 may be processed. Also or alternatively, when the control information is received on the additional channel (e.g., CH_1, CH_2, . . . , and CH_K), the control information received through a corresponding sub-node 720 may be transmitted to the master node 710 and may be processed.

At step S1126, the center node 700 may determine whether the relevant control period is terminated. In the case where the relevant control period is not terminated, when the control information to be transmitted is present and the transmission period 812 of the center node 700 remains, the control information may be transmitted at step S1122. When the control information to be transmitted is not present or when the transmission period 812 of the center node 700 does not remain, but a reception period 814 of the center node 700 remains within a control period 810, the control information may be received at step S1124. As described above, it is possible to support the wireless frame structure in which the transmission period 812 of the center node and the reception period 814 of the center node are present only once as well as several times repeatedly within one control period.

When the relevant control period is terminated or when the remaining control period is not present, the center node 700 may determine whether a remaining data period is present at step S1130. In the case where the data period is present, when data is received on the basic channel (e.g., CH_0) within the relevant data period at step S1132, the data received through the master node 710 may be processed. Also or alternatively, when the data is received on the additional channel (e.g., CH_1, CH_2, . . . , and CH_K), the data received through the corresponding sub-node 720 may be transmitted to the master node 710 and may be processed.

At step S1134, the center node 700 may determine whether the relevant data period is terminated. When the relevant data period is not terminated at step S1134, the center node 700 may receive data through at least one channel of the basic channel or the additional channel(s).

When the relevant data period is terminated or when the remaining data period is not present, the center node 700 may determine whether the relevant wireless frame is terminated at step S1140.

When the relevant wireless frame is terminated, waiting for the start of a subsequent wireless frame may be performed, going back to step S1110.

When the relevant wireless frame is not terminated, whether the remaining control period is present may be determined, going back to step S1120. As described above, it is possible to support the wireless frame structure in which the control period 810 and the data period 820 are present only once as well as several times repeatedly within one wireless frame.

Figure 12:
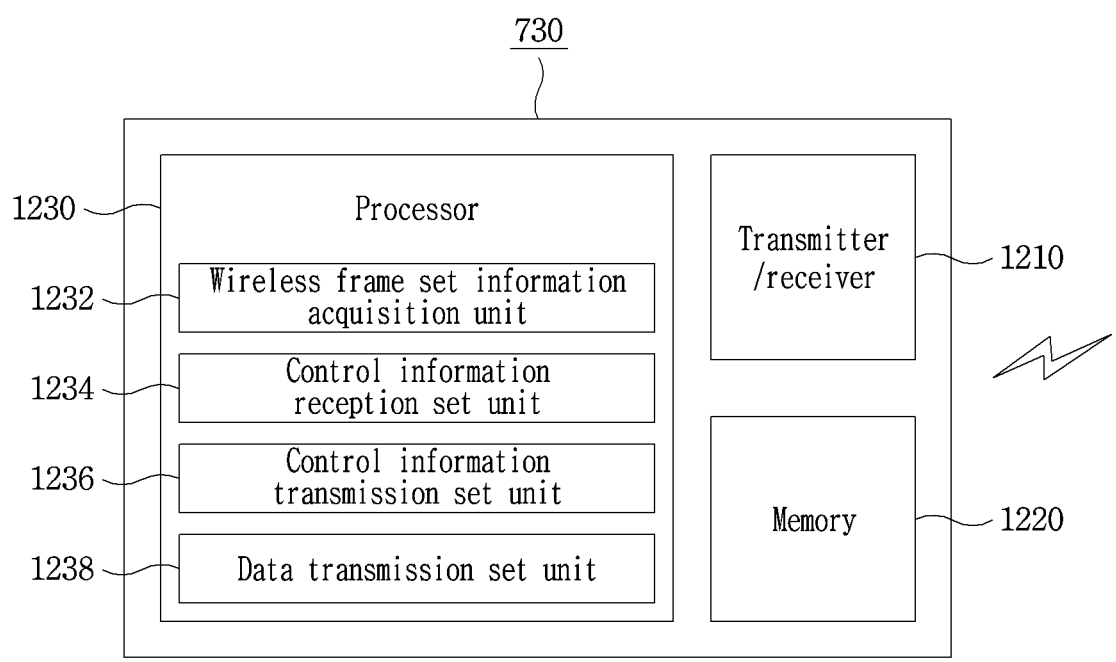
FIG. 12 is a block diagram illustrating a structure of an end node device according to the present disclosure.

FIG. 12 is a block diagram illustrating a structure of an end node device according to the present disclosure.

The end node device, which is also referred to as the end node 730, may include a transmitter/receiver 1210, a memory 1220, and a processor 1230. The configuration of the end node 730 is merely exemplary, and is not limited to the example of FIG. 12. Some or all of the constituents in FIG. 12 may be included, or additional constituents may be further included.

The transmitter/receiver 1210 may transmit the control information, the data packet, etc. to another device, or may receive the control information, the data packet, etc. from another device.

The memory 1220 may store the control information, data, calculation results, etc. that are necessary for operation of the end node 730.

The processor 1230 may control overall operation of the end node 730.

For example, the processor 1230 may include a wireless frame set information acquisition unit 1232, a control information reception set unit 1234, a control information transmission set unit 1236, and a data transmission set unit 1238.

The wireless frame set information acquisition unit 1232 may acquire, from the center node, information on the length of the wireless frame between beacon intervals, on the number of repetitions of control period and data period within the wireless frame and respective lengths thereof, etc.

The control information reception set unit 1234 may check identification information of the basic channel on which the control information is received by the end node from the center node, and information on the length, the position, the number of repetitions of the reception period within the control period. Also, the control information reception set unit 1234 may set the transmitter/receiver 1210 to attempt to receive the control information on the relevant channel and in the relevant time period.

The control information transmission set unit 1236 may check information on the channel on which the control information is transmitted by the end node to the center node, and information on the length, the position, the number of repetitions of the transmission period within the control period. Also, the control information transmission set unit 1236 may set the transmitter/receiver 1210 to transmit the control information on the relevant channel and in the relevant time period. Here, as a channel on which the control information is transmitted, the basic channel is preferentially selected. When the basic channel is not in the idle state, the channel may be determined in such a manner as to select one randomly from additional channels.

The data transmission set unit 1238 may check, based on the control information, such as the resource assignment information provided from the center node, a channel and a data time period where transmission is allowed, and may set the transmitter/receiver 1210 to transmit data on the relevant channel and in the relevant time period.

Figure 13:
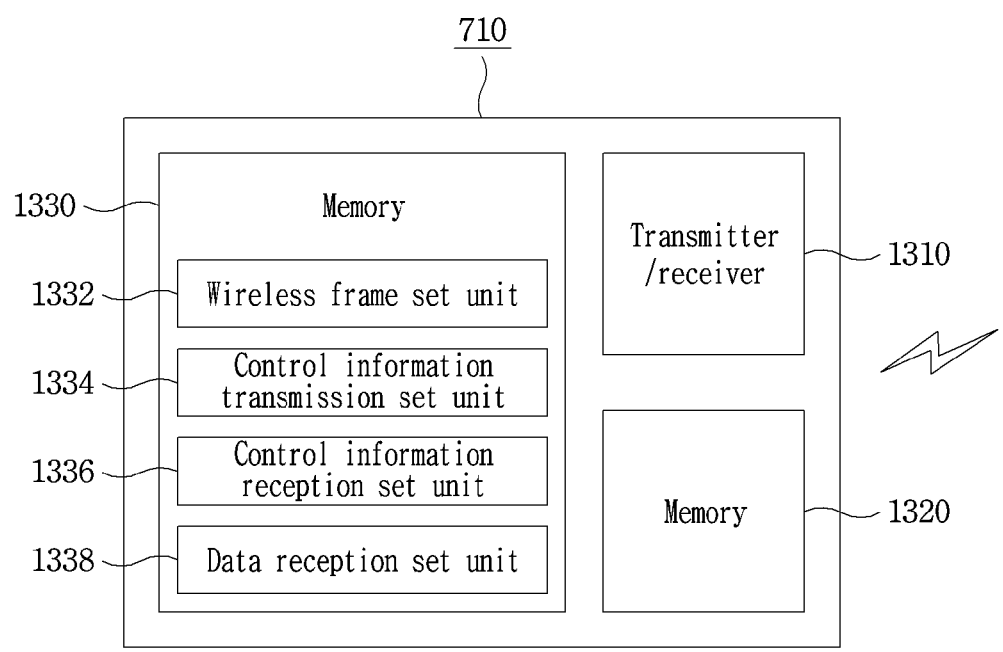
FIG. 13 is a block diagram illustrating a structure of a master node according to the present disclosure.

FIG. 13 is a block diagram illustrating a structure of a master node according to the present disclosure.

As described above with reference to FIG. 7, a center node device, which is also referred to as the center node 700, may include one master node 710, one or more sub-nodes 720, and a communication path 715 therebetween. Each sub-node 720 may include a transmitter/receiver operating on a relevant channel, a memory, etc., and is assumed to be controlled by the master node 710.

As shown in FIG. 13, the master node 710 may include a transmitter/receiver 1310, a memory 1320, and a processor 1330. The configuration of the master node 710 is merely exemplary, and is not limited to the example of FIG. 13. Some or all of the constituents in FIG. 13 may be included, or additional constituents may be further included.

The transmitter/receiver 1310 may transmit the control information, the data packet, etc. to another device, or may receive the control information, the data packet, etc. from another device.

The memory 1320 may store the control information, data, calculation results, etc. that are necessary for operation of the master node 710.

The processor 1330 may control overall operation of the center node 700 that includes the master node 710.

For example, the processor 1330 may include a wireless frame set unit 1332, a control information transmission set unit 1334, a control information reception set unit 1336, and a data reception set unit 1338.

The wireless frame set unit 1332 may determine information on the length of the wireless frame between beacon intervals, on the number of repetitions of the control period and the data period within the wireless frame and respective lengths thereof, etc. Also, the wireless frame set unit 1332 may transmit the wireless frame set information to the end node 730, etc. through the beacon frame, upper layer signaling, etc.

The control information transmission set unit 1334 may set the transmitter/receiver 1310 to transmit the control information on the relevant channel and in the relevant time period on the basis of the basic channel on which the master node 710 transmits the control information to the end node 730 and of setting on the length, the position, the number of repetitions of the transmission period within the control period.

The control information reception set unit 1336 may set the transmitter/receiver 1310 to attempt to receive the control information on the relevant channel and in the relevant time period on the basis of the channel on which the master node 710 and the sub-node 720 receive the control information from the end node 730 and of setting on the length, the position, the number of repetitions of the transmission period within the control period. Here, the master node 710 may monitor whether the control information is received on the basic channel, and may control the sub-nodes 720 to monitor whether the control information is received by the sub-nodes 720 corresponding to the additional channels.

The data reception set unit 1338 may check, based on the control information such as the resource assignment information provided to the end node 730, a channel and a time period where data transmission of the end node 730 is allowed, and may control to perform an attempt to reception. For example, the master node 710 may monitor whether data is received on the basic channel in the time period where data reception is allowed, and may control the sub-nodes 720 to monitor whether data is received by the sub-nodes 720 corresponding to the additional channels. Here, data may be received from one end node 730 in a specific time period, or data may be received from multiple end nodes 730 simultaneously on different channels in a specific time period.

In the above described various examples of the present disclosure, methods of enhancing flexibility of wireless resource assignment in the sensor network, of performing low power based operation, and of accommodating multiple nodes have been described. According to the various examples of the present disclosure, in order to overcome the limitation of the transfer rate on one wireless channel, a method of overall controlling multi wireless channel transmission by one center node has been proposed. Also, according to the various examples of the present disclosure, in order to maximize the efficiency of wireless resource utilization, dynamic channel assignment is possible by separating the control period and the data period for each channel (or frequency), a fixed transfer rate is guaranteed for multiple nodes, and a control channel is assigned flexibly, whereby a wireless frame configuration method for optimal utilization of wireless resources may be provided. Thus, multiple devices with high transfer rate are accommodated and multiple wireless channels are controlled overall based on a single center node, whereby the system throughput may be enhanced ultimately.

Although exemplary methods of the present disclosure are represented as a series of operations for clarity of description, the order of the steps is not limited thereto. When necessary, the illustrated steps may be performed simultaneously or in a different order. In order to implement the methods according to the present disclosure, the illustrative steps may further include other steps, or some steps are excluded and the remaining steps are included, or some steps are excluded and additional other steps are included.

The various embodiment of the present disclosure do not list all possible combinations, and are intended to be illustrative the representative aspects of the present disclosure. The matters described in the various embodiments may be independently applied or in a combination of two or more.

Also, the various embodiments of the present disclosure may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, micro processors, etc.

The scope of the present disclosure includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to execute on a device or a computer.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of transmitting control information by an end node in a wireless, communication system supporting multi-channel transmission, the end node being connected to a center node configuring and managing a network supporting multiple channels, the method comprising:

transmitting control information to the center node on a first channel among multiple channels within a control period of a wireless frame when the first channel is in an idle state, wherein the center node includes one master node and one or more sub-nodes, the master node performing transmission and reception on a basic channel among the multiple channels, and the one or more sub-nodes performing reception from the end node on other channels among the multiple channels;

transmitting the control information to the center node on a second channel when the first channel is not in the idle state and the second channel is in the idle state, wherein the second channel is selected from channels other than the first channel among the multiple channels; and transmitting the control information to the center node in a subsequent wireless frame when the second channel is not in the idle state.

2. The method of claim 1, wherein the control period of the wireless frame includes a control information reception period of the end node and a control information transmission period of the end node.

3. The method of claim 1, wherein the wireless frame includes the control period and a data period.

4. The method of claim 3, wherein in a specific time period determined based on resource assignment information within the data period of the wireless frame, the end node transmits data to the center node on a third channel determined based on the resource assignment information among the multiple channels.

5. The method of claim 4, wherein the resource assignment information includes information on a channel on which transmission of the end node is allowed, a time at which transmission of the end node is allowed, a transmission size of the end node, and a transmission cycle of the end node.

6. The method of claim 4, wherein in the specific time period, data transmission on the third channel from the end node to the center node is performed simultaneously with data transmission on a fourth channel from, other than the end node, another end node to the center node.

7. The method of claim 4, wherein the third channel is one of the first channel and the second channel.

8. The method of claim 4, wherein the third channel is a channel other than the first channel and the second channel.

9. The method of claim 1, wherein the control information transmitted on the first channel is received by the master node of the center node, and the control information transmitted on the second channel is received by one sub-node corresponding to the second channel among the one or more sub-nodes of the center node.

10. The method of claim 1, wherein the end node receives a beacon frame from the center node at a start time of the wireless frame.

11. The method of claim 1, wherein the control information includes at least one of registration request information and resource assignment request information of the end node.

12. An end node device that transmits control information in a wireless communication system supporting multi-channel transmission and is connected to a center node configuring and managing a network supporting, multiple channels, the end node device comprising:

a transceiver;
a memory; and
a processor, wherein the processor is configured to, within a control period of a wireless frame, transmit control information to the center node on a first channel among multiple channels within a control period of a wireless frame when the first channel is in an idle state, wherein the center node includes one master node and one or more sub-nodes, the master node performing transmission and reception on a basic channel among the multiple channels, and the one or more sub-nodes performing reception from the end node on other channels among the multiple channels;

transmit the control information to the center node on a second channel when the first channel is not in the idle state and the second channel is in the idle state, wherein the second channel is selected from channels other than the first channel among the multiple channels; and transmit the control information to the center node in a subsequent wireless frame when the second channel is not in the idle state.

13. A method of operating a center node in a wireless communication system supporting multi-channel transmission, the center node configuring and managing a network supporting multiple channels and being connected to an end node, the method comprising:

transmitting control information to the end node on a first channel among multiple channels within a control period of a wireless frame, wherein the center node includes one master node and one or more sub-nodes, the master no performing transmission and reception on a basic channel among the multiple channels, and the one or more sub-nodes performing reception from the end node on other channels among the multiple channels; and receiving the control information from the end node on the first channel or on a second channel among the multiple channels within the control period of the wireless frame, wherein the second channel is a channel selected randomly among the multiple channels by the end node when the first channel is not in an idle state.

14. The method of claim 13, wherein the control period of the wireless frame includes a control information transmission period of the center node and a control information reception period of the center node.

15. The method of claim 13, wherein the wireless frame includes the control period and a data period.

16. The method of claim 15, wherein within the data period, data reception on a third channel from the end node to the center node is performed simultaneously with data reception on a fourth channel from, other than the end node, another end node to the center node.

17. The method of claim 16, wherein the third channel is one of the first channel and the second channel.

18. The method of claim 16, wherein the third channel is a channel other than the first channel and the second channel.

19. The method of claim 13, wherein the control information received on the first channel is received by the master node of the center node, and the control information received on the second channel is received by one sub-node corresponding to the second channel among the one or more sub-nodes of the center node.

20. A center node device that operates in a wireless communication system supporting multi-channel transmission, configures and manages a network supporting multiple channels and is connected to an end node, the center node device comprising:

a transceiver;
a memory; and
a processor,
wherein the processor is configured to,
transmit control information to the end node on a first channel among multiple channels within a control period of a wireless frame, wherein the center node includes one master node and one or more sub-nodes, the master node performing transmission and reception on a basic channel among the multiple channels, and the one or more sub-nodes performing reception from the end node on other channels among the multiple channels;
receive the control information from the end node on the first channel or on a second channel among the multiple channels within the control period of the wireless frame, wherein the second channel is a channel selected randomly among the multiple channels by the end node when the first channel is not in an idle state.

* * * * *